United States Patent Office 3,088,819
Patented May 7, 1963

3,088,819
PROCESS AND COMPOSITION FOR REDUCING CORROSION OF ALUMINUM METALS
Garland B. Funkhouser, Hopewell, Va., assignor to Allied Chemical Corporation, a corporation of New York
No Drawing. Filed May 20, 1955, Ser. No. 510,046
12 Claims. (Cl. 71—50)

This invention relates to a process for reducing corrosion of aluminum metals (aluminum and its alloys) contacted with aqueous solutions of ammonium nitrate and ammonium phosphate by incorporating in those solutions a small amount of an inorganic fluoride soluble in the solution effective to materially reduce the rate of corrosion of the metal. The invention further includes those aqueous solutions of ammonium nitrate and ammonium phosphate containing in solution therein an inorganic fluoride in amount effective to reduce substantially the rate of corrosion of aluminum metals by the solution.

Solutions of ammonium phosphate having the composition $(NH_4)_{(1.5-1.7)}H_{(1.5-1.3)}PO_4$ and ammonium nitrate in water have been found particularly suitable for use as fertilizers either by direct application to the soil or in the preparation of fertilizer compositions. Particularly those solutions containing (by weight) 11% to 36% of the ammonium phosphate, 10% to 34% of the ammonium nitrate and 50% to 68% water have been found to be characterized by low salting out temperatures, below 10° C., and stable with respect to their nitrogen content, and thus especially fitted for use as fertilizer solutions.

Such solutions are relatively non-corrosive to ordinary steel. They may be shipped and handled in steel equipment without presenting any real problem of corroding such equipment. However, the fertilizer trade also employs for similar purposes alkaline, ammoniacal salt solutions, particularly ammonia-ammonium nitrate solutions. These ammoniacal solutions are corrosive toward steels. Accordingly, much of the equipment in use for handling fertilizer solutions is constructed of aluminum or aluminum alloys, which are adequately resistant to corrosion by these ammoniacal solutions. Since the same equipment is usable both for the ammoniacal fertilizer solutions and the non-alkaline ammonium phosphate-ammonium nitrate solutions to which this invention relates, the marketing and use of these latter solutions has presented the problem of preventing undue corrosion of aluminum equipment in which they are handled.

I have discovered that by incorporating in the aqueous ammonium phosphate-ammonium nitrate solutions even a very small amount of an inorganic fluoride soluble therein, the rate of corrosion of aluminum and of its alloys in contact with these solutions is greatly reduced. It then becomes feasible to store, transport and utilize these solutions in equipment in which they are in contact with aluminum or an alloy of aluminum.

My invention accordingly comprises incorporating in a non-alkaline solution of ammonium phosphate and ammonium nitrate in water, 0.05% to 1% by weight of an inorganic fluoride (calculated as F) and contacting the resulting solution with an aluminum metal. Preferably, these amounts of the fluoride are incorporated in an aqueous ammonium phosphate-ammonium nitrate solution composed of 11% to 36% by weight of an ammonium phosphate having the composition $(NH_4)_{(1.5-1.7)}H_{(1.5-1.3)}PO_4$ 10% to 34% by weight of ammonium nitrate and 50% to 68% by weight water, which is contacted with the aluminum metal. My invention further comprises the ammonium phosphate-ammonium nitrate-fluoride-water solutions of the foregoing composition of very low corrosiveness toward aluminum and its alloys.

The invention is of especial importance in its application to solutions particularly suitable for fertilizer uses, but the use of the fluoride to inhibit corrosion of aluminum is not limited to the solutions of the particular concentrations used for that purpose. The fluorides are effective to inhibit corrosion of aluminum and its alloys by aqueous solutions of ammonium phosphates and ammonium nitrates which are non-alkaline, i.e. substantially neutral or even having pH values somewhat below 7. It is apparent, of course, they would not be used in strongly acidic solutions under conditions resulting in evolution of hydrogen fluoride.

With respect to the fluoride which may be added to the aqueous ammonium phosphate-ammonium nitrate solution, the preferred, commonly available fluorides are the alkali metal, including ammonium fluoride and bifluoride, and the fluorides and bifluorides of potassium and sodium. While the use of a fluoride of which the cation would form an insoluble material in the solution is not desirable, the essential characteristic is that it imparts soluble fluoride to the solution at least in the small amounts needed for the inhibition of the corrosion of aluminum metals. Accordingly, any fluoride may be used which is sufficiently soluble in the ammonium phosphate-ammonium nitrate solution to impart at least 0.05% dissolved fluoride (calculated as F) to the solution. While the preferred range of dissolved fluoride in the solution is that equivalent to 0.1% to 0.5% F, this is primarily a matter of cost. Effective inhibition of the corrosion is obtained using 1% F. Substantially more fluoride than this is not economically justified. Further, it is not desirable to use an amount of fluoride exceeding its solubility in the solution at temperatures above 10° C. because of the practical desirability that the solutions do not salt out or form a precipitate at those temperatures.

The presence of the fluoride in the aqueous solutions of ammonium phosphate and ammonium nitrate serves to reduce substantially the rate of corrosion of alloys of aluminum which are attacked by those solutions in the absence of the fluoride. Alloys commonly used in equipment to be protected by employing this invention range from substantially pure aluminum (over 99%) to aluminum containing up to about 5% of alloying elements, principally silicon, manganese, magnesium, or chromium, or combinations of these, and the aluminum alloys with a copper content not above about 0.25%.

The following example is illustrative of my invention. Amounts expressed as parts are by weight.

Example 1.—A solution was prepared by diluting 657 parts of a commercial-grade phosphoric acid, analyzing 60.25% $P_2O_5$, with 1447 parts water and partially neutralizing the diluted acid with 152 parts of gaseous ammonia. Ammonium nitrate amounting to 743.4 parts was then added and dissolved in the solution of ammonium phosphate. The finished solution contained 12.82% N and 13.00% $P_2O_5$ and had a pH of 6.1. The composition of the ammonium phosphate present corresponded to $(NH_4)_{(1.6)}H_{(1.4)}PO_4$.

One portion of the solution was retained as made. To another portion ammonium fluoride was added in amount equivalent to 0.1% F based on the weight of the solution. Corrosion data for an aluminum alloy of the composition 3.5% magnesium, 0.25% chromium with the balance aluminum and normal impurities, immersed in these solutions is given in the following table:

Table 1

|  | Test No. | |
| --- | --- | --- |
|  | 1 | 2 |
| Percent F in solution | 0 | 0.1 |
| Penetration (inches/year): |  |  |
| First 7 days | 0.031 | 0.0064 |
| Second 7 days | 0.031 | 0.0060 |

The solution containing fluoride remained nearly clear, while the one with no fluoride present became contaminated with a voluminous white precipitate, presumably of corrosion products.

To another portion of the ammonium phosphate-ammonium nitrate-water solution of the above example, ammonium fluoride was added in amount sufficient to incorporate in it 0.5% F (by weight) as dissolved fluoride. In contact with this solution over a period of nine days, aluminum metal was corroded at a rate of only 0.0036 inch penetration per year.

I claim:

1. The process for reducing corrosion of aluminum and its alloys in contact with a non-alkaline solution of ammonium phosphate and ammonium nitrate in water, which comprises incorporating in said solution 0.05% to 1% by weight of an inorganic fluoride (calculated as F) soluble in the solution.

2. The process of claim 1 in which the fluoride is an alkali metal fluoride.

3. The process of claim 1 in which 0.05% to 0.1% of the fluoride (calculated as F) is incorporated in the solution.

4. The process of claim 1 in which the ammonium phosphate present in the solution has the composition $(NH_4)_{(1.5-1.7)}H_{(1.5-1.3)}PO_4$.

5. The process of claim 3 in which the ammonium phosphate present in the solution has the composition $(NH_4)_{(1.5-1.7)}H_{(1.5-1.3)}PO_4$.

6. The process of claim 5 in which the aqueous ammonium phosphate-ammonium nitrate solution is composed (by weight) of 11% to 36% of the ammonium phosphate having the composition $$(NH_4)_{(1.5-1.7)}H_{(1.5-1.3)}PO_4$$

10% to 34% ammonium nitrate and 50% to 68% water.

7. As a new composition of matter of reduced corrosiveness toward aluminum and its alloys, a non-alkaline solution of ammonium phosphate and ammonium nitrate in water containing in solution therein 0.05% to 1% by weight of an inorganic fluoride (calculated as F).

8. The composition of claim 7 in which the fluoride is an alkali metal fluoride.

9. The composition of claim 7 in which the fluoride present amounts to 0.05% to 0.1% by weight of the solution.

10. The composition of claim 7 in which the ammonium phosphate present in the solution has the composition $(NH_4)_{(1.5-1.7)}H_{(1.5-1.3)}PO_4$.

11. The composition of claim 9 in which the ammonium phosphate present in the solution has the composition $(NH_4)_{(1.5-1.7)}H_{(1.5-1.3)}PO_4$.

12. The composition of claim 11 in which the aqueous ammonium phosphate-ammonium nitrate solution is composed (by weight) of 11% to 36% of the ammonium phosphate having the composition $$(NH_4)_{(1.5-1.7)}H_{(1.5-1.3)}PO_4$$

10% to 34% ammonium nitrate and 50% to 68% water.

References Cited in the file of this patent

UNITED STATES PATENTS

| 1,999,026 | Tramm et al. | Apr. 23, 1935 |
| 2,061,191 | Foss et al. | Nov. 17, 1936 |
| 2,064,325 | Sutton et al. | Dec. 15, 1936 |
| 2,205,754 | Sweeney et al. | June 25, 1940 |
| 2,241,638 | Efield | May 13, 1941 |
| 2,550,425 | Phillips | Apr. 24, 1951 |
| 2,719,781 | Hesch | Oct. 4, 1955 |